Z. T. CLAGETT.
Corn Planter.
No. 80,058.
Patented July 21, 1868.
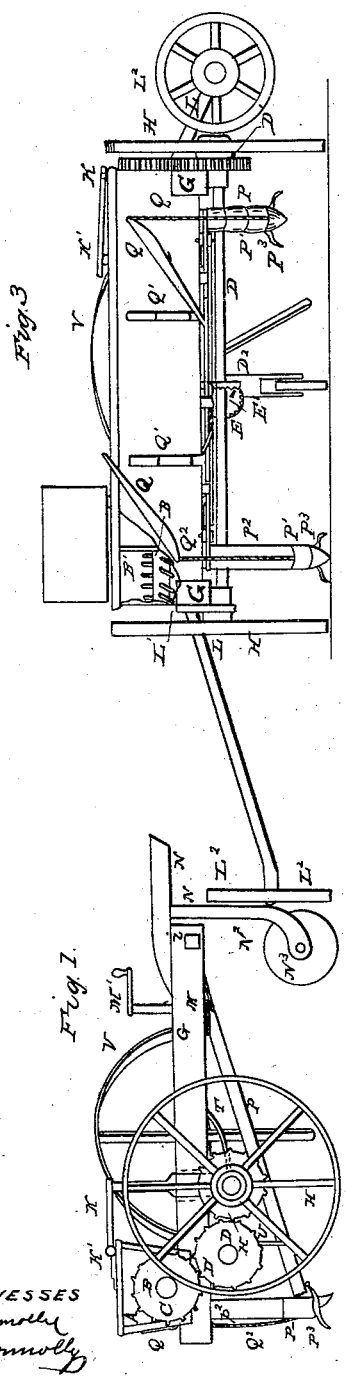
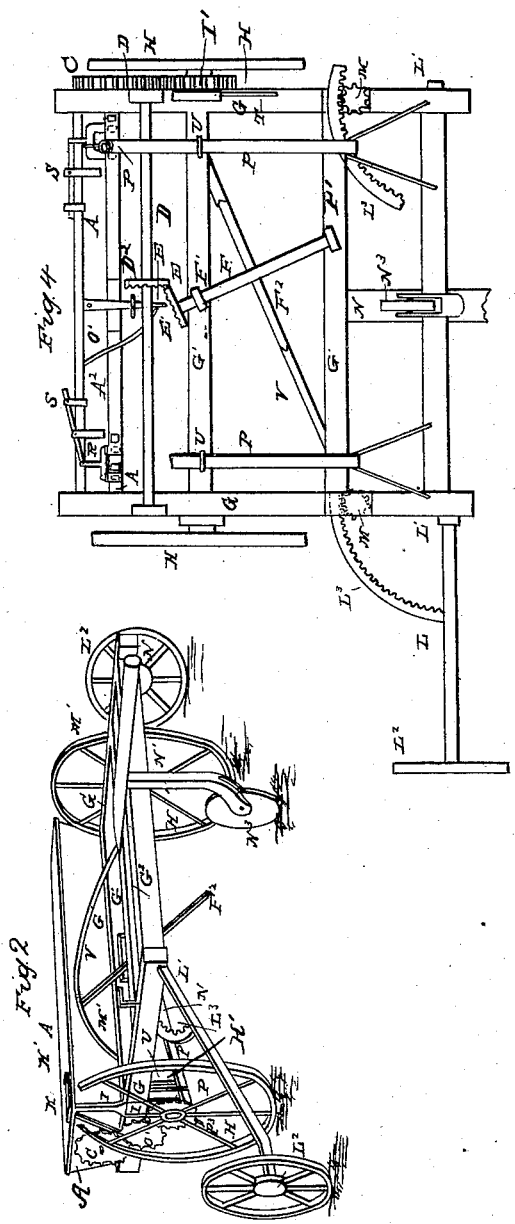
WITNESSES
INVENTOR

United States Patent Office.

ZACHARIAH T. CLAGETT, OF WASHINGTON, DISTRICT OF COLUMBIA.

Letters Patent No. 80,058, dated July 21, 1868.

IMPROVEMENT IN CORN-PLANTER.

*The Schedule referred to in these Letters Patent and making part of the same.*

TO ALL WHOM IT MAY CONCERN:

Be it known that I, ZACHARIAH T. CLAGETT, of the city of Washington, county of Washington, District of Columbia, have invented new and useful Improvements in Corn-Planters; and I do hereby declare that the following is a full, clear, and complete description of the same, reference being had to the annexed drawings, making part of this specification, in which—

Figure 1 is a perspective view.
Figure 2 is a side elevation.
Figure 3 is a rear view, and
Figure 4 is a view of the bottom of the corn-planter.

In the different figures the same letters refer to identical parts.

A is the box, divided into several apartments to contain the corn to be planted. Through said box passes longitudinally the horizontal bar B, supplied with teeth B', as shown in fig. 3. On the end of bar B is placed the cog-wheel C, by which it receives motion from one of the main wheels, as hereinafter shown. In fig. 4 are shown the apertures, two at each end, in the bottom of box A, through which the corn passes. There is also in the bottom of said box a groove, A$^1$, in which fits the slide A$^2$, and is also supplied with two holes in each end the same size as those in the box A. This slide has a lever, O, of the second power attached to it, as shown in fig. 4, by which it is moved. Attached to the wheel D$^1$ is a horizontal bar, D, extending under the box A. On this bar, near the middle, is placed the cog-wheel D$^2$, acting upon another cog-wheel, E. On the outer surface of the wheel E, near the circumference, and directly opposite each other, two small teeth, E', are placed, which come alternately in contact with the wedge-shaped end of the lever O, as the wheel E is made to revolve. The wheel E is placed upon the end of the bar or axle F, extending in an oblique direction with the frame of the machine, as shown in fig. 4. This bar revolves in the journals F$^1$ F$^1$ placed on those parts of the machine marked G$^1$ G$^1$.

H H are the wheels by which the corn-planter is moved along the ground. On the axle-tree of one of these wheels is placed the cog-wheel H', which, acting upon the wheel D$^1$, makes the wheel D move. The axle of the wheels H' and H' revolves in the journal in the lower portion of the support I', and terminates at its inner surface. The frame, G, of the machine has a notch or mortise cut in it above the axle of the wheel H', into which said support is placed, room being allowed to move freely. Over this support, after it has been placed in position, a plate of metal is fixed, through which an axle passes, passing also through the support I, and behind the support through the frame. Upon this axle it is allowed to move. Extending upward, the support has attached to its upper end a lever, K, which is kept in place by the catch K'. By means of lever K and support, the machine may be allowed to move along the ground without operating the seeding-devices, by disconnecting the wheel H' from the wheel D$^1$. Near the forward portion, on each side of the machine, extend the arms L L, attached to it by the hinge L'. These arms have wheels, L$^2$, attached to the outer ends of each. They have also each a curved bar, L$^3$, extending from them under the frame of the machine, as shown in drawings. On the inside of the curves are cogs working the wheel M, to which are attached the crank M'. From the second bar, G$^1$, of the frame of this machine extends the tongue N, having attached to it a vertical bar, N$^1$, which has fitting into it a socket, at N$^2$ a portion of the standard or stem of the caster-wheel N$^3$, as shown in the drawings. This bar N$^1$ may be placed outside of the first bar, G$^2$, of the frame of the machine, as shown, or inside, as convenience requires. P P represent the drag-bars, upon the ends of which are affixed, as shown, the drill-teeth P$^1$ P$^1$, which are situated directly under the holes in the bottom of the box. To the upper portions of said plows are attached flexible tubes P$^2$ P$^2$, extending upward until near the aforesaid apertures. The grain drops through these tubes and through the drill-teeth into the furrows formed by them. The drag-bars P may be divided near their forward ends, forming braces, and joined to the first bar G$^2$ by an articulating joint. To the rear of the box A are attached the levers Q, held in different positions by the catches Q$^1$, and having cords, ropes, or chains Q$^2$ attached, which are also attached to the plows for the purpose of raising and lowering the plows, when necessary. At the bottom of the box A are shown the double slides R R, with levers S S attached. These slides may be either on the outside or inside of the slide $A^2$, and fit over the holes in the slide $A^2$ and box A. At about the centre of the diagonal shaft F, and running through it, is a marker consisting of a bar of iron, having pointed or shovel-shaped ends. V is a bow of metal or wood fastened at each end to the bars $G^1$ $G^1$, and covering the marker $F^2$ in the direction shown in the drawings. This bow is for the purpose of preventing the reins from the horses from being caught by the marker as it goes round.

Attached to the bars P P are the bent pieces of iron, or other suitable material, as shown in drawings, figs. 2 and 3. From the lever O extends the spring O', fastened at one end to the bottom of the box, and is intended to spring back the lever O, after the teeth E' of the wheel E have passed over the end of lever O.

There is also a spring, T, extending from the support H to the frame of the machine, for the purpose of keeping the wheels H' and $D^1$ close together. The bars P rest on the supports $u$, consisting of U-shaped metal rods, the ends being fixed in the frame of the machine.

This machine operates as follows: The corn is placed in the box A, and the machine being put in motion by the main wheel H acting upon the others, the wheel $D^1$, and axle D, and wheel $D^2$ are made to revolve. The wheel $D^2$, which is in contact with the wheel E, causes wheel E, axle F, and marker $F^2$ to rotate. This marker is so arranged that, when it is in a vertical position, scraping the ground, one of the teeth, E', will come in contact with the end of the lever O, and, moving the slide $A^2$ by means of said lever such a distance as is required, cause the holes in the slide $A^2$ to cover those in the box A, thus allowing the corn to pass through, thence through the flexible tubes $P^2$ and drill-teeth $P^1$. But only a small amount of corn being required in one place, the slide, by means of the lever O, being acted upon by spring O', springs back after the teeth E' pass over the end of the lever O. The holes in the box are thus covered by portions of the slide $A^2$ passing over them. When, the machine being in motion, it is desirable to allow no corn to leave the box through the holes in the bottom, it can be done by means of the slides R R covering both series of holes.

This machine being intended to plant corn in check-rows of hills, the scraper or marker is intended to mark the position of the rows which are to run at right angles to those which are being made at the time the marker is in action. For this purpose the shaft F is placed on the frame in an oblique or angular position, as shown. As the scraper would not make its marks at right angles were the axle to be placed parallel with the sides of the machine, this scraper is placed at such a distance from the bar O that the rows marked shall run between those that are being made. The wheels $L^2$ attached to the arms L are for the purpose of guiding the regularities of the rows after the first has been made. To do this, the first row being made, and the machine turned round to return in the direction from which it proceeded, the wheel nearest the row made is placed upon that row, and, being constructed of very light material, moves smoothly over the row, thus making the next row and the one over which it rolls exactly parallel. While one wheel is moving, the other may be drawn up by means of the crank M' towards the side of the machine. The caster-wheel $N^3$ is to support the machine in front, at the same time making it run easily, and having a joint, $N^2$, to allow the machine to be turned freely. When turning the machine, the innermost of the large running-wheels should serve as a pivot or centre, around which the other may move. The caster-wheel $N^3$ is therefore made to turn in its socket, wheeling easily around in the manner intended. The distance between the caster-wheel $N^3$ and the bar P should be equal to the distance between the rows, and the marker should be exactly the same distance from each.

What I claim as my invention, and seek to secure by Letters Patent, is—

1. The diagonal shaft F and scraper $F^2$, in connection with the cog-wheel E, constructed as described, the lever O, spring O', slide $A^2$, axle D, wheels $D^2$, H', $D^1$, C, and H, and also the bar B, constructed as specified. Also, in connection with wheels H' and H, I claim the support I, with lever K and catch K', and spring T attached, working in the manner and for the purpose described. Operating together with slide $A^2$, I claim slide R and lever S, arranged as and for the purpose set forth. I claim, in connection with the scraper $F^2$, the bow V, for the purpose set forth.

2. The arrangement of the arms L, constructed with wheels $L^2$, bars $L^3$, wheels M, and cranks $M^1$, substantially as and for the purpose set forth.

3. The levers Q with cords or chains, as described, in connection with the drill-teeth $P^1$, tube $P^2$, and corn-coverers $P^3$, joined to bars P by a joint, as shown in drawings, and supports U, substantially as and for the purposes set forth. I claim, in combination with levers Q, the catches Q', arranged for the purpose set forth.

ZACHARIAH T. CLAGETT.

Witnesses:
   THOS. A. CONNOLLY,
   EDM. F. BROWN.